(12) United States Patent
Kashima

(10) Patent No.: US 6,711,378 B2
(45) Date of Patent: Mar. 23, 2004

(54) ONLINE EDUCATION COURSE WITH CUSTOMIZED COURSE SCHEDULING

(75) Inventor: Kazuo Kashima, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 09/737,485

(22) Filed: Dec. 18, 2000

(65) Prior Publication Data

US 2002/0001793 A1 Jan. 3, 2002

(30) Foreign Application Priority Data

Jun. 30, 2000 (JP) .................................. 2000-200026

(51) Int. Cl.⁷ ................................................ G09B 3/00
(52) U.S. Cl. .................... 434/350; 434/322; 434/118
(58) Field of Search ................................ 434/350, 322, 434/118

(56) References Cited

U.S. PATENT DOCUMENTS

| | | | |
|---|---|---|---|
| 5,823,781 A | * 10/1998 | Hitchcock et al. | 434/118 |
| 6,149,441 A | * 11/2000 | Pellegrino et al. | 434/350 |
| 6,353,447 B1 | * 3/2002 | Truluck et al. | 345/733 |
| 6,368,110 B1 | * 4/2002 | Koenecke et al. | 434/219 |
| 6,507,726 B1 | * 1/2003 | Atkinson et al. | 434/350 |

FOREIGN PATENT DOCUMENTS

WO WO 01/01269 A1 * 1/2001 ........... G06F/15/16

OTHER PUBLICATIONS

Burrows, V.A.; Frontiers in Education Conference, 1997. 27th Annual Confernece. 'Teaching and Learning in an Era of Change'. Proceedings., vol.: 1, Nov. 5–8, 1997.*

* cited by examiner

Primary Examiner—Teresa Walberg
Assistant Examiner—Cameron Saadat
(74) Attorney, Agent, or Firm—Staas & Halsey LLP

(57) ABSTRACT

The online education device comprises a schedule information database which stores standard schedule information on an education course. A schedule allotment control section receives at least a day when the participant desires to start the course and a period for which the participant desires to take the course from the participant. The schedule allotment control section then set the day when the participant desires to start the course as a day when the course starts, rearranges the standard schedule information to create schedule information corresponding to the period for which the participant desires to take the course.

11 Claims, 15 Drawing Sheets

FIG.2A

40 USER INFORMATION DATABASE

| NAME | USER ID | POST | SECTION | DATE WHEN PARTICIPANT JOINED COMPANY | SEX | E-MAIL ADDRESS | PASSWORD | ... |
|---|---|---|---|---|---|---|---|---|
| FUJITSU TARO | 120010 | ORDINARY | DEVELOPMENT | 20000401 | MALE | taro@se.flm.co.jp | Taro10 | ... |
| FUJIYAMA HANAKO | 110112 | ORDINARY | OFFICE CLERK | 19990401 | FEMALE | hanako@se.flm.co.jp | HF0401 | ... |
| FUJITA ICHIRO | 500553 | SECTION CHIEF | DEVELOPMENT | 19750401 | MALE | ichiro@se.flm.co.jp | 55301 | ... |
| ... | ... | ... | ... | ... | ... | ... | ... | ... |

FIG.2B

50 PARTICIPANT INFORMATION DATABASE

| NAME | COURSE CODE | USER ID | APPLICATION DAY | STARTING DAY | ENDING DAY | E-MAIL ADDRESS | ... |
|---|---|---|---|---|---|---|---|
| FUJITSU TARO | 1001 | 120010 | 20000315 | 20000401 | 20000531 | taro@se.flm.co.jp | ... |
| FUJIYAMA HANAKO | 1001 | 110112 | 20000407 | 20000408 | 20000607 | hanako@se.flm.co.jp | ... |
| FUJITA ICHIRO | 1001 | 500553 | 20000310 | 20000401 | 20000430 | ichiro@se.flm.co.jp | ... |
| ... | ... | ... | ... | ... | ... | ... | ... |

FIG.3A

60 TEACHER INFORMATION DATABASE

| NAME | TEACHER ID | CODE OF COURSE IN CHARGE | STARTING DAY | ENDING DAY | TEACHER NAME | E-MAIL ADDRESS | ... |
|---|---|---|---|---|---|---|---|
| FUJI ICHIRO | K10011 | 1001 | 20000401 | 20000630 | UXA12B TEACHER IN CHARGE | ichi@te.flm.co.jp | ... |
| HARUNA HANAKO | K10020 | 1021 | 20000501 | 20000731 | UXA12A TEACHER IN CHARGE | hanako@te.flm.co.jp | ... |
| AKAGI JIRO | K10021 | 1022 | 20001001 | 20001130 | UXA12C TEACHER IN CHARGE | jiro@te.flm.co.jp | ... |
| ... | ... | ... | ... | ... | ... | ... | ... |

FIG.3B

70 COURSE INFORMATION DATABASE

| COURSE NAME | COURSE CODE | STANDARD LEARNING TIME | REGISTRATION DAY | COURSE TARGET | MATERIAL | ... |
|---|---|---|---|---|---|---|
| PROJECT MANAGEMENT BASIC, 01 EDITION | 1001 | 60 | 20000301 | ORDINARY | CD-ROM | ... |
| LET'S START SPREADSHEET 2000 | 1021 | 30 | 20000401 | ALL PARTICIPANTS | OLM | ... |
| LET'S START SPREADSHEET 2000 | 1022 | 30 | 20000901 | ALL PARTICIPANTS | OLM | ... |
| ... | ... | ... | ... | ... | ... | ... |

FIG.4A

80 SCHEDULE INFORMATION DATABASE

COURSE NAME : PROJECT MANAGEMENT BASIC    COURSE ID: 1001

| No. | RELATIVE DATE | ITEM | WHETHER REARRANGEMENT IS POSSIBLE | REARRANGEMENT UNIT | SHORTEST DAYS | LONGEST DAYS | ... |
|---|---|---|---|---|---|---|---|
| 1 | 0 | CHAPTER 1 DESCRIPTION OF COURSE | Y | 1 | 0 | 30 | ... |
| 2 | 4 | CHAPTER 1 TEST | N | 1 | 2 | 27 | ... |
| 3 | 7 | CHAPTER 2 DESCRIPTION OF COURSE | Y | 2 | 3 | 26 | ... |
| ... | ... | ... | ... | ... | ... | ... | ... |
| 22 | 54 | CHAPTER n DESCRIPTION OF COURSE | Y | 2 | 28 | 58 | ... |
| 21 | 60 | CHAPTER n TEST | N | 1 | 30 | 60 | ... |

FIG.4B

90 BULLETIN BOARD INFORMATION DATABASE

COURSE NAME : PROJECT MANAGEMENT BASIC    COURSE ID: 1001

| UTTERANCE NUMBER | ORIGINAL UTTERANCE NUMBER | CLASSIFICATION | TITLE | UTTERANCE DAY | UTTERANCE ID | NUMBER OF TIMES OF REFERENCE | ... |
|---|---|---|---|---|---|---|---|
| 001 | — | Topic | ABOUT KANA TRANSFORMATION ON ONE-CHARACTER-BY-ONE-CHARACTER BASIS | 20000412 | K10011 | 9 | ... |
| 002 | — | Topic | ABOUT THE SHORTCUT MENU | 20000413 | K10011 | 9 | ... |
| 003 | — | DESCRIPTION | CHAPTER 3 ENTRY OF CHARACTER | 20000414 | K10011 | 7 | ... |
| 004 | 003 | QUESTION | ESC BUTTON AND BACK SPACE BUTTON | 20000414 | 1001 | 43 | ... |
| 005 | 004 | ANSWER | [ESC] KEY AND [BACK SPACE] KEY | 20000415 | K10011 | 21 | ... |
| ... | ... | ... | ... | ... | ... | ... | ... |

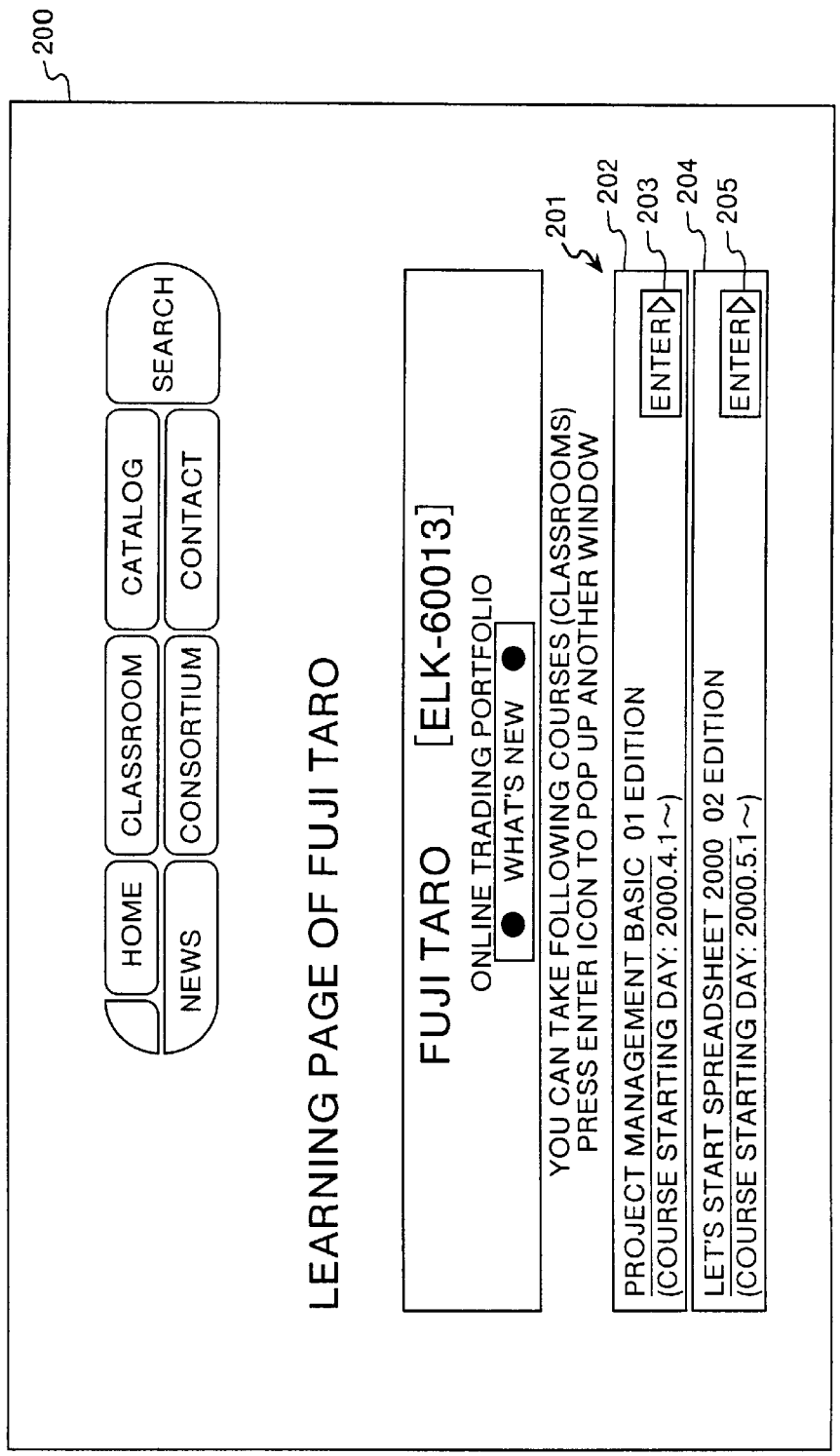

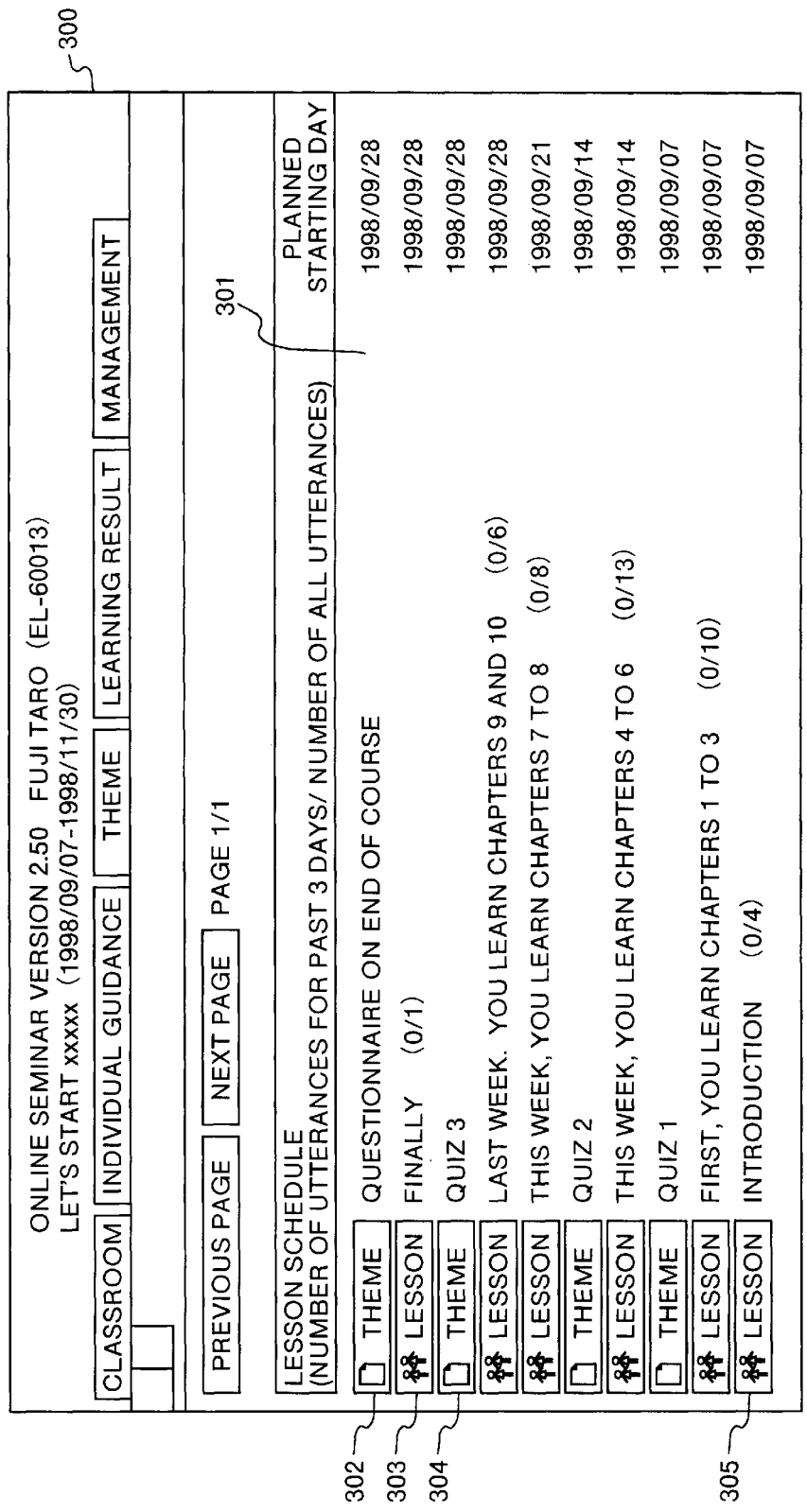

FIG.11A

PARTICIPANT: FUJITSU TARO
COURSE PERIOD (2000/4/1~5/31)
→SCHEDULE FOR STANDARD COURSE PERIOD

400

| No. | DATE | LEARNING SCHEDULE |
|---|---|---|
| 1 | 20000401 | CHAPTER 1   DESCRIPTION OF MATERIAL |
| 2 | 20000405 | CHAPTER 1   TEST |
| 3 | 20000408 | CHAPTER 2   DESCRIPTION OF MATERIAL |
| 4 | 20000412 | CHAPTER 2   TEST |
| ⋮ | ⋮ | ⋮ |

FIG.11B

PARTICIPANT: FUJIYAMA HANAKO
COURSE PERIOD (2000/4/8~6/7)
→SCHEDULE STARTING ON 4/8

410

| No. | DATE | LEARNING SCHEDULE |
|---|---|---|
| 1 | 20000408 | CHAPTER 1   DESCRIPTION OF MATERIAL |
| 2 | 20000412 | CHAPTER 1   TEST |
| 3 | 20000415 | CHAPTER 2   DESCRIPTION OF MATERIAL |
| 4 | 20000419 | CHAPTER 2   TEST |
| ⋮ | ⋮ | ⋮ |

FIG.11C

PARTICIPANT : FUJITA, ICHIRO
COURSE PERIOD (2000/4/8~4/30)
→SCHEDULE HALF THE STANDARD COURSE PERIOD

420

| No. | DATE | LEARNING SCHEDULE |
|---|---|---|
| 1 | 20000408 | CHAPTER 1   DESCRIPTION OF MATERIAL |
| 2 | 20000410 | CHAPTER 1   TEST |
| 3 | 20000411 | CHAPTER 2   DESCRIPTION OF MATERIAL |
| 4 | 20000412 | CHAPTER 2   TEST |
| ⋮ | ⋮ | ⋮ |

FIG.12

| LEARNER | 4/1 | 4/5 | 4/8 | 4/12 | 4/15 | 4/19 | |
|---|---|---|---|---|---|---|---|
| FUJITSU TARO | LEARNING CHAPTER 1 → TEST     LEARNING CHAPTER 2 → TEST | | | | | | ~510 |
| FUJIYAMA HANAKO | LEARNING CHAPTER 1 → TEST     LEARNING CHAPTER 2 → TEST | | | | | | ~520 |
| FUJITA ICHIRO | LEARNING CHAPTER 1 → TEST     LEARNING CHAPTER 2 → TEST | | | | | | ~530 |

| ONLINE SEMINAR [ PROJECT MANAGEMENT BASIC (2000/4/1~2000/5/1) ] | | | | |
|---|---|---|---|---|
| CLASSROOM | INDIVIDUAL GUIDANCE | THEME | LEARNING RESULT | MANAGEMENT |
| LESSON | FIRST, YOU LEARN CHAPTERS 1 TO 3 | | ▼ DISPLAY | NEW UTTERANCES |

Topic1 : KANA TRANSFORMATION ON
ONE-CHARACTER-BY-ONE-CHARACTER BASIS   UXA12B   TEACHER IN CHARGE   2000/04/08
(NUMBER OF TIMES OF REFERENCE = 9)

Topic1 : ABOUT SHORTCUT MENU   UXA12B   TEACHER IN CHARGE   2000/04/09
(NUMBER OF TIMES OF REFERENCE = 9)

DESCRIPTION : CHAPTER 3 ENTRY OF CHARACTER   UXA12B   TEACHER IN CHARGE   2000/04/10
(NUMBER OF TIMES OF REFERENCE = 7)

QUESTION : ABOUT ESC BUTTON AND BACK SPACE BUTTON   KAWASHIMA KAZUKI   2000/04/10
(NUMBER OF TIMES OF REFERENCE = 49)

ANSWER : HOW TO USE [ESC] KEY AND [BACK SPACE] KEY   UXA12B   TEACHER IN CHARGE   2000/04/08
(NUMBER OF TIMES OF REFERENCE = 21)

⋮

TITLE: FIRST, YOU LEARN CHAPTERS 1 TO 3
(REGISTRANT: UXA12   TEACHER IN CHARGE   REGISTRATION DATE : 2000/4/7   NUMBER OF TIMES OF REFERENCE: 279)
TEXT: LET'S START LEARNING AT ONLINE SEMINAR! THIS WEEK, YOU LEARN CHAPTERS 1 TO 3. WHEN YOU FINISH
LEARNING WITH TEST, TRY QUIZ.

ONLINE EDUCATION COURSE WITH CUSTOMIZED COURSE SCHEDULING

FIELD OF THE INVENTION

The present invention relates to a technology which allows many people to take education over the Internet or the like and which is very convenient form the participants point of view.

BACKGROUND OF THE INVENTION

In recent years, with the spread of the Internet, there exist many online education sites for allowing a participant to select a desired course from among a plurality of courses opened online and then to take the course. However, at the conventional online education sites, course provider sides predetermine course schedules on curricula. Participants are, therefore, disadvantageously forced to arrange time to the course schedule and restricted by time. For these reasons, means and methods for effectively solving these disadvantages with a view of further spreading online education have been conventionally desired.

As an education method, there exists an online education system wherein an online education site is established through the Internet and participants take courses through this online education site. The online education system of this type generally consists of an online education server connected to the Internet and providing the above-stated online education site to participants, and of a plurality of clients installed at a plurality of participants, respectively, and accessing the online education site.

In addition, at the online education site, a plurality of types of courses are prepared to allow participants to take desired courses. As for these courses, a course starting day, a course ending day, a course period and a curriculum schedule are preset and fixed by a course provider side. Accordingly, a participant applies for a course by providing information such as course starting day, course ending day, course period and schedule are suitable for the participant, using a course guidebook or the like.

When such application is made, the participant is given an ID and a password and receives learning material, if necessary. The participant accesses the online education site from the participant's client according to the fixed schedule, waits for the authentication of his or her ID and password and then takes the course.

Meanwhile, as already stated above, according to the conventional online education system, the course provider sets fixed course starting day, course ending day, course period and curriculum schedule. Due to this, participants need to arrange time to the schedule and a degree of freedom for application is disadvantageously low. Accordingly, if the course opening day for a desired course already passed when a participant applies for the course, the participant conventionally needs to wait for a day when the next course opens, which makes against participants' advantages.

Further, according to the conventional online education system, despite the fact that participants differ in skill, a course period is fixedly set. Due to this, the conventional system has disadvantage in that a course period is too long for a participant having much skill and too short for a participant having little skill. It is, therefore, difficult for all participants to expect education exceeding a certain level.

SUMMARY OF THE INVENTION

It is an object of the present invention to provide a technology with which the participants can select a course schedule with higher degree of freedom and thus improve the educational effect.

In the method and device of the present invention, the course starting day desired by the participant is set as the actual course starting day and schedule information corresponding to a desired course period is created. As a result, degree of freedom in a schedule for the participant can be made higher. In addition, the present invention can set the length of the desired course period according to participant's skill. Therefore, it is possible for the participant to acquire education without causing any strain and to enhance educational effect.

Other objects and features of this invention will become apparent from the following description with reference to the accompanying drawings.

BRIEF DESCRIPTION OF THE DRAWINGS

FIG. 2 shows a user information database 40 and a participant information database 50 show in FIG. 1;

FIG. 3 shows a teacher information database 60 and a course information database 70 shown in FIG. 1;

FIG. 4 shows a schedule information database 80 and a bulletin information database 90 shown in FIG. 1;

FIG. 9 shows a screen 200 in this embodiment;

FIG. 10 shows a screen 300 in this embodiment;

FIG. 11 shows participant-specific schedules 400, 410 and 420 in this embodiment;

FIG. 12 shows a participant schedule 500 in this embodiment;

FIG. 14 shows a screen 600 in this embodiment; and

DESCRIPTION OF THE PREFERRED EMBODIMENTS

Figure 1:
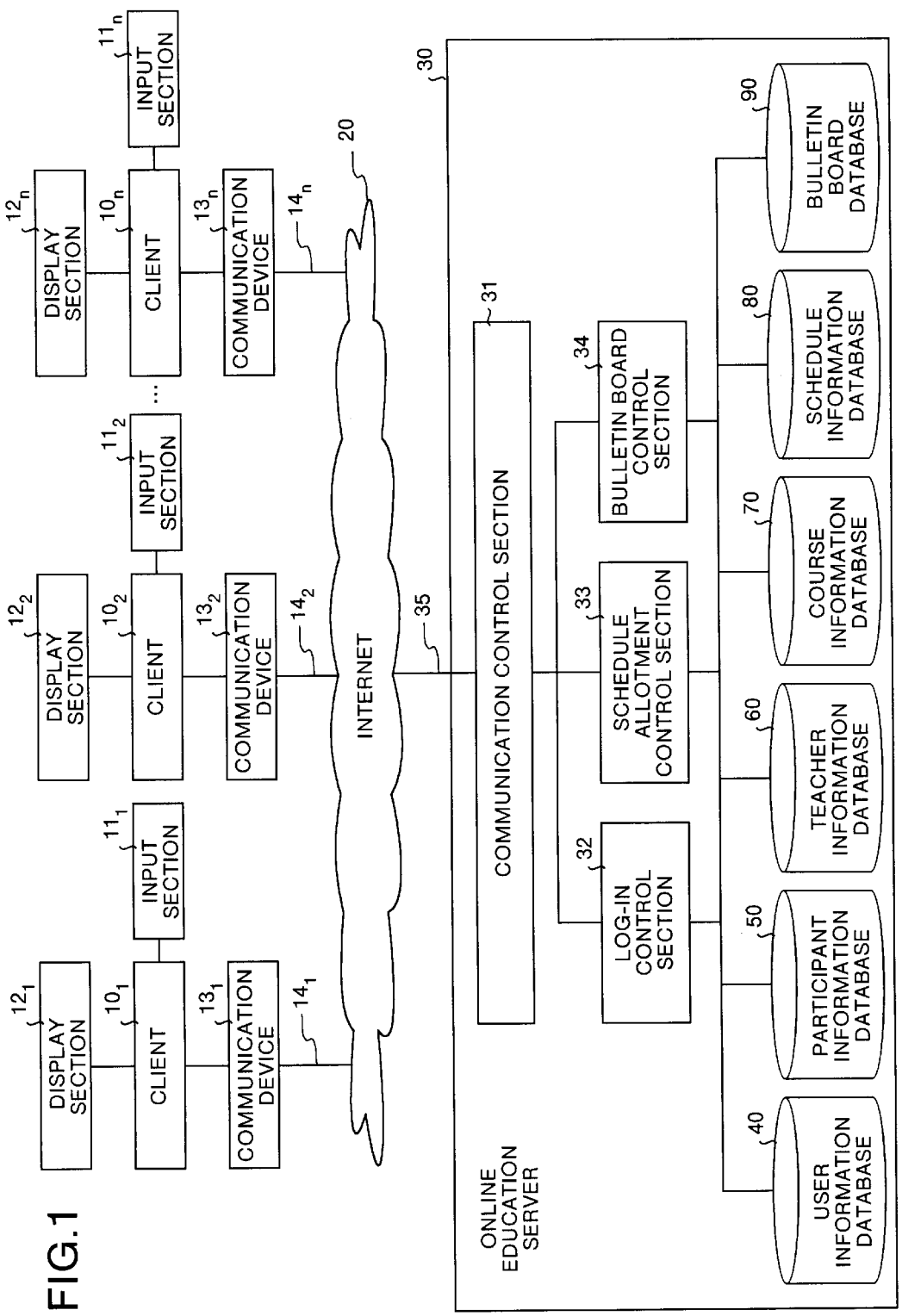
FIG. 1 is a block diagram showing the constitution of one embodiment according to the present invention.

One preferred embodiment of an online education device, an online education method and a computer readable recording medium recording an online education program according to the present invention will be described hereinafter in detail with reference to the accompanying drawings. FIG. 1 is a block diagram showing the constitution of one embodiment according to the present invention. FIG. 1 shown an online education system that provides various courses to a plurality of participants through the Internet 20. The courses here means, for example, courses on how to use various application software, or courses relating to computer knowledge and the like.

A client $10_1$ is a computer terminal provided at a participant side and is comprised of an input section $11_1$ such including a keyboard and a mouse and a display section $12_1$ including a display. This client $10_1$ is connected to the Internet 20 via a communication device $13_1$ and a communication line $14_1$ and made accessible to an online education server 30 for taking online education.

At the other participant's side, clients $10_2$ to $10_n$ are provided, respectively, as well. The clients $10_2$ to $10_n$ are provided with input sections $11_2$ to $11_n$ and display sections $12_2$ to $12_n$, respectively. In addition, the clients $10_2$ to $10_n$ are connected to the Internet 20 via communication devices $13_2$ to $13_n$ and communication lines $14_2$ to $14_n$, respectively, and made accessible to the online education server 30.

The online education server 30 is provided at a course provider side and connected to the Internet 20 via a communication line 35. This online education server 30 is a server to receive participants, create course schedules, provide course information and the like. In the online education server 30, a communication control section 31 controls communication between the server 30 and the clients $10_1$ to $10_n$ according to a predetermined communication protocol. A log-in control section 32 controls log-in from the clients $10_1$ to $10_n$. A schedule allotment control section 33 controls the allotment of course schedules for the participants. A bulletin board control section 34 conducts write-control over an electronic bulletin board relating to courses. This electronic bulletin board is viewed by participants.

Further, the online education server 30 employs various databases including a user information database 40, a participant information database 50, . . . and a bulletin board information database 90. The user information database 40 stores information on the users of the online education system (to be referred to as 'user information' hereinafter). To be specific, as shown in FIG. 2A, the user information data base 40 consists of user "names", "user IDs", "post", "sections", "date when users entered the company", "male or female", "email addresses", "passwords". Here, the "user ID" is an identifier for identifying a user and the "password" is used together with the "user ID" when the user logs in the online education server 30.

The participant information database 50 shown in FIG. 2B stores information on participants who take courses (to be referred to as "participant information" hereinafter). The participant is a participant who take courses actually, among the user. To be specific, participant information consists of participants' "names", "course codes", "user IDs", "application days", "starting days", "ending days", and "email addresses" . . . . Here, the "course code" is an identifier for identifying a course. The "user ID" is the same as the "user ID" in the user information database 40. The "application day" is a day when the participant applied for a course. The "starting day" is a day when the course starts. The "ending day" is a day when the course ends.

The teacher information database 60 shown in FIG. 3A stores information on teachers in charge of various courses (to be referred to as "teacher information" hereinafter). To be specific, the teacher information database 60 consists of teachers' "names", "teachers' IDs", "teachers' course codes", "starting days", "ending days", "teachers' names", "email addresses", . . . . Here, the "teacher's ID" is an identifier for identifying a teacher. The"teacher's course code" is a code allotted to a course and the same as the "course code" (see FIG. 2B) in the participant information database 50. The "starting day" is a day when the teacher starts a course in charge. The "ending day" is a day when the teacher ends the course". The "teacher's name" is a name given to a teacher in the database.

The course information database 70 shown in FIG. 3B stores information on various courses (to be referred to as "course information" hereinafter). To be specific, the course information database consists of "names" of courses, "course codes", "standard learning periods", "registration days", "target participants", "materials", . . . . Here, the "course code" is an identifier for identifying a course. The "standard learning period" is the standard learning period (course period) of the course. The "registration day" is a day when the course information was registered in the course information data base 70. The "target participant" is a range of participants in the course. The "material" is a type of material used in the course.

The schedule information database 80 shown in FIG. 4A stores information on course schedules (to be referred to as "schedule information" hereinafter) and consists of schedule information $80_1$, $80_2$, $80_3$, . . . . These items of schedule information $80_1$, $80_2$, $80_3$ correspond to course information on records 1 to 3 (course codes 1001, 1021 and 1022) respectively.

For example, the schedule information $80_1$ is information on a detailed schedule (curriculum) for a course identified as course ID (code): 1001. The schedule information $80_1$ consists of "Nos.", "relative dates", "items", "whether or not rearrangement is possible", "rearrangement units", "shortest days", "longest days", . . . . The "No." is a serial number allotted to each item (curriculum) of a course. The "relative date" is a date relative to the "starting day" of the participant information database 50 shown in FIG. 2B. For example, with "No."=2, "item"=Chapter 1, test, "relative date"="4", the "Chapter 1, test" is conducted four days after the "starting day" described above.

Further, the "relative date" shown in FIG. 4A is set so that a participant with standard skill can take the course without causing strain. Accordingly, the "relative date" of the last item (Chapter n, test) is 60 and a standard learning period for a course named "Project Management Basic" is, therefore, 60 days. The "item" is a curriculum of the course named "Project Management Basic".

The "whether or not rearrangement is possible" indicates whether or not it is possible to rearrange the schedule. The schedule rearrangement here includes the change of the order of items on the schedule, the shortening of the relative date and the like. The example shown in FIG. 4A indicates that if "whether or not rearrangement is possible"="Y", schedule rearrangement can be made for the item. On the other hand, if "whether or not rearrangement is possible"= "N", rearrangement cannot be made for the item. The "rearrangement unit" represents a unit for rearrangement. The "shortest days" represents the minimum value of the relative date. The example shown in FIG. 4A, therefore, means that the course can be ended in 30 days at the shortest. The "longest days" represents the maximum value of the relative date.

The bulletin board information database 90 shown in FIG. 4B stores information on a bulletin board for each course (to be referred to as "bulletin board information" hereinafter) and consists of bulletin board information $90_1$, $90_2$, $90_3$, . . . . The bulletin board information includes the description of a course, questions, answers and the like. The bulletin board information is uttered (written) and referred to by a teacher in charge of the course. Further, the bulletin board information $90_1$, $90_2$ and $90_3$ correspond to the course information on the records 1 to 3 (course codes 1001, 1021 and 1022).

For example, the bulletin board information $90_1$ is information on the bulletin board for the course identified as course name: Project Management Basic, course ID (code): 1001. This bulletin board information $90_1$ consists of "utterance numbers", "original utterance numbers", "classifications", "titles", "utterance days", "utterer IDs", "number of times of reference", . . . . The "utterance number" is a serial number allotted to information uttered (written) by either a participant or a teacher. The "original utterance number" is an utterance number allotted to information previously uttered.

The "classification" is provided to classify utterance information and consists of "Topics", "descriptions", "questions" and "answers". The "title" is a title of the uttered information. The "utterance day" is a day when either a participant or the teacher wrote utterance information on the bulletin board. The "utterance ID" is the ID of the user who gave utterance. The "number of times of reference" is the number of times by which the utterance information was referred to by either the participants or the teacher.

Figure 5:
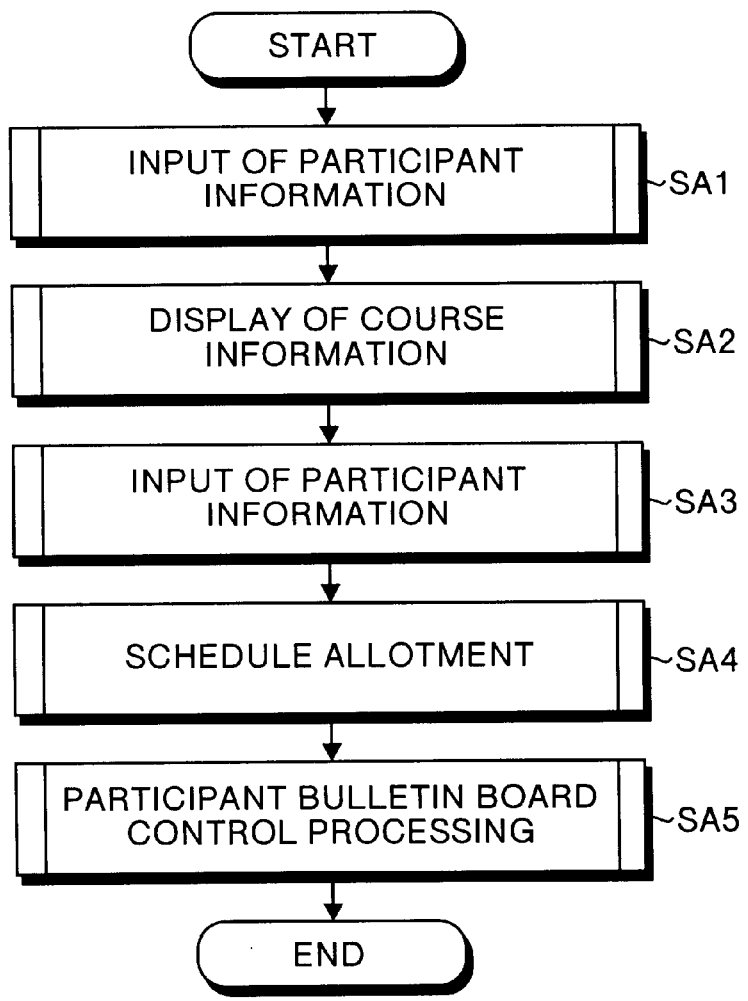
FIG. 5 is a flowchart of an operation in this embodiment.

Next, the schematic operation of one embodiment stated above will be described with reference to a flow chart shown in FIG. 5. In a step SA1 shown in FIG. 5, participant information (user ID, password and the like) are inputted. In a step SA2, information on courses which can be taken by the participant is displayed to the participant. In a step SA3, course information including the starting day of the course, a course period and the like with respect to the course selected by the participant is inputted. In a step SA4, based on the course information, a schedule for the course is allotted. In a step SA5, control for displaying the schedule, curriculum, material information and communication information on communication among the teacher and other participants of the course on the participant bulletin board is carried out.

Figure 6:
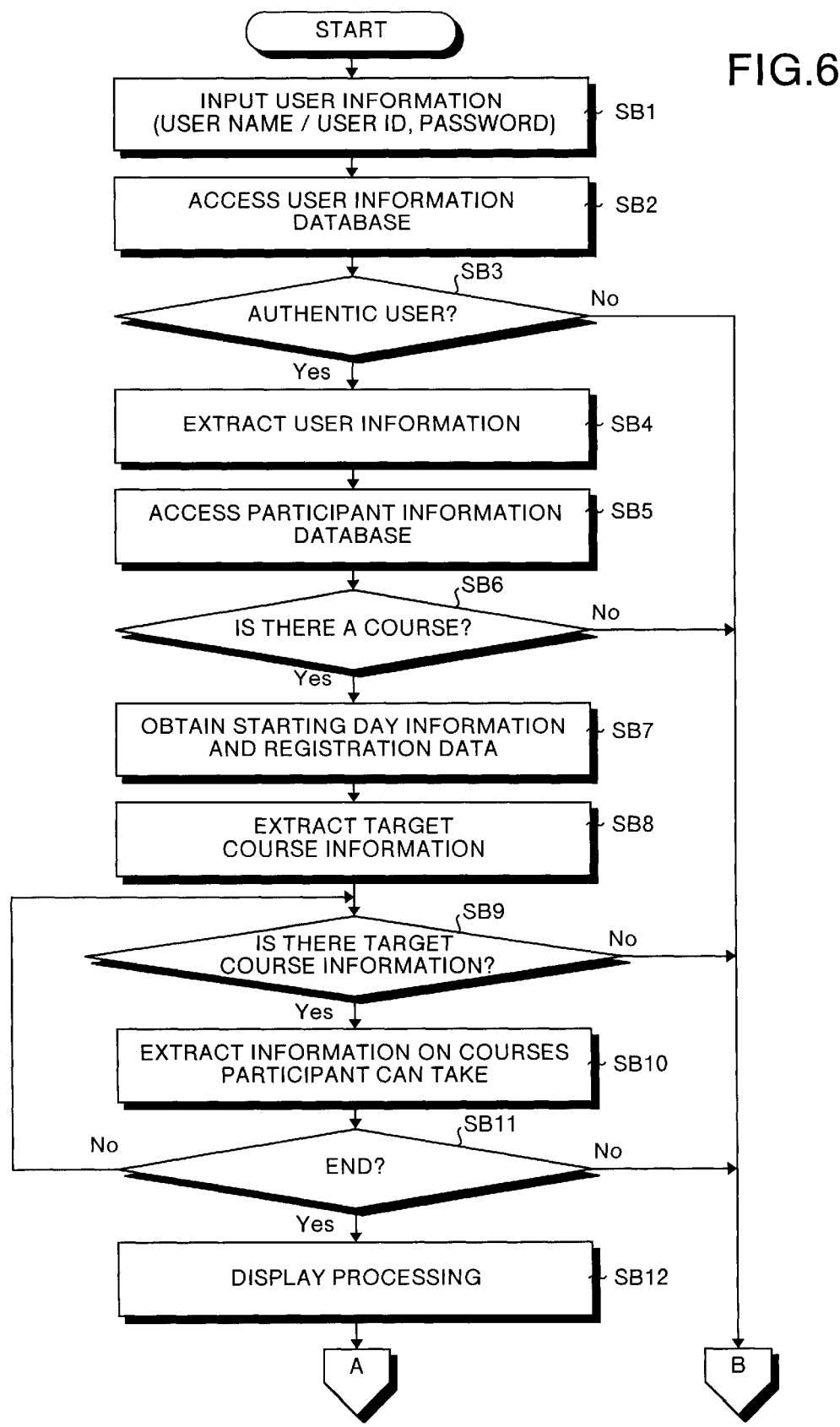
FIG. 6 is a flow chart for describing the operations of a log-in control section 32 and a schedule allotment control section 33 shown in FIG. 1.
Figure 7:
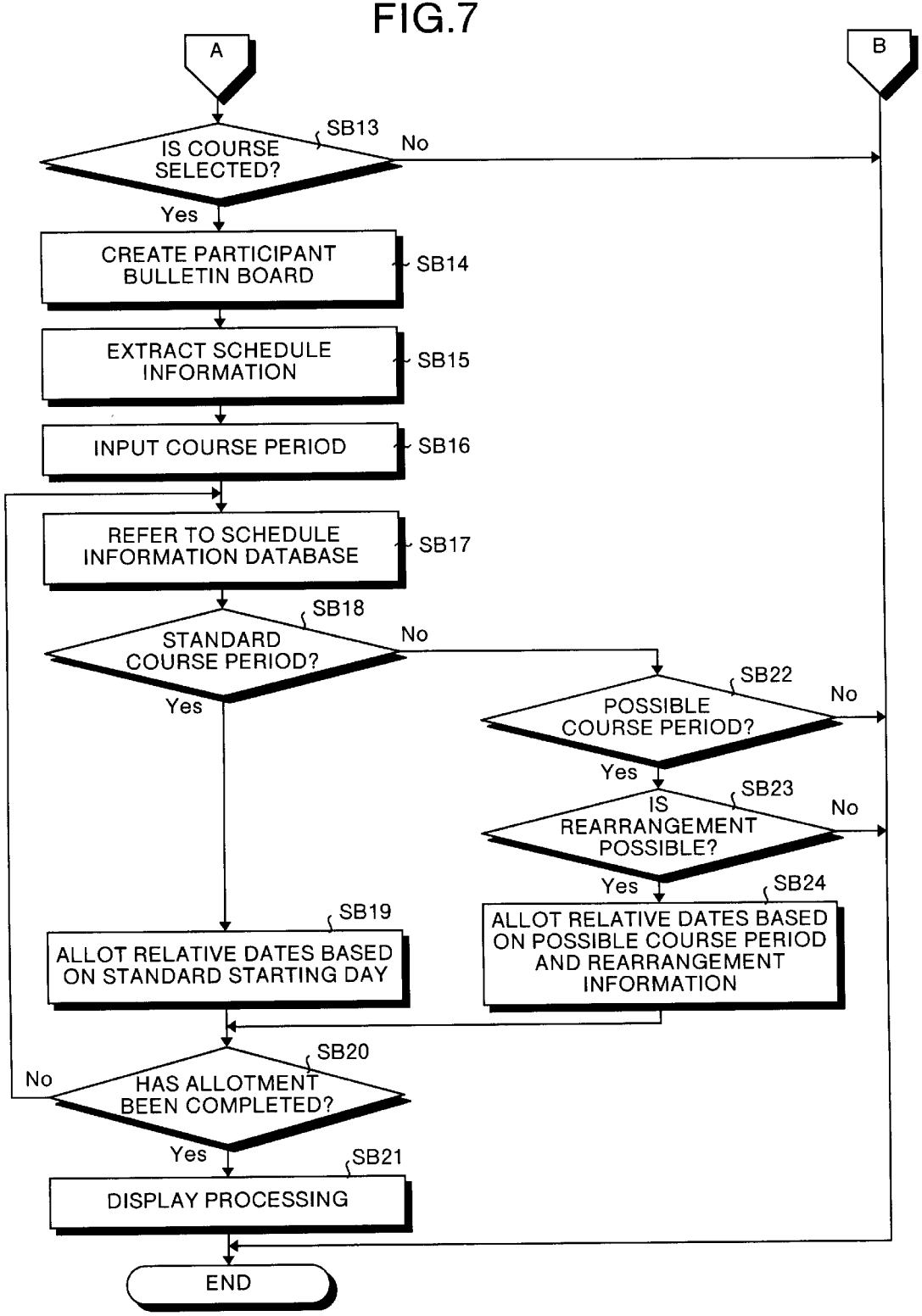
FIG. 7 is a flow chart for describing the operations of the log-in control section 32 and the schedule allotment control section 33 shown in FIG. 1.
Figure 13:
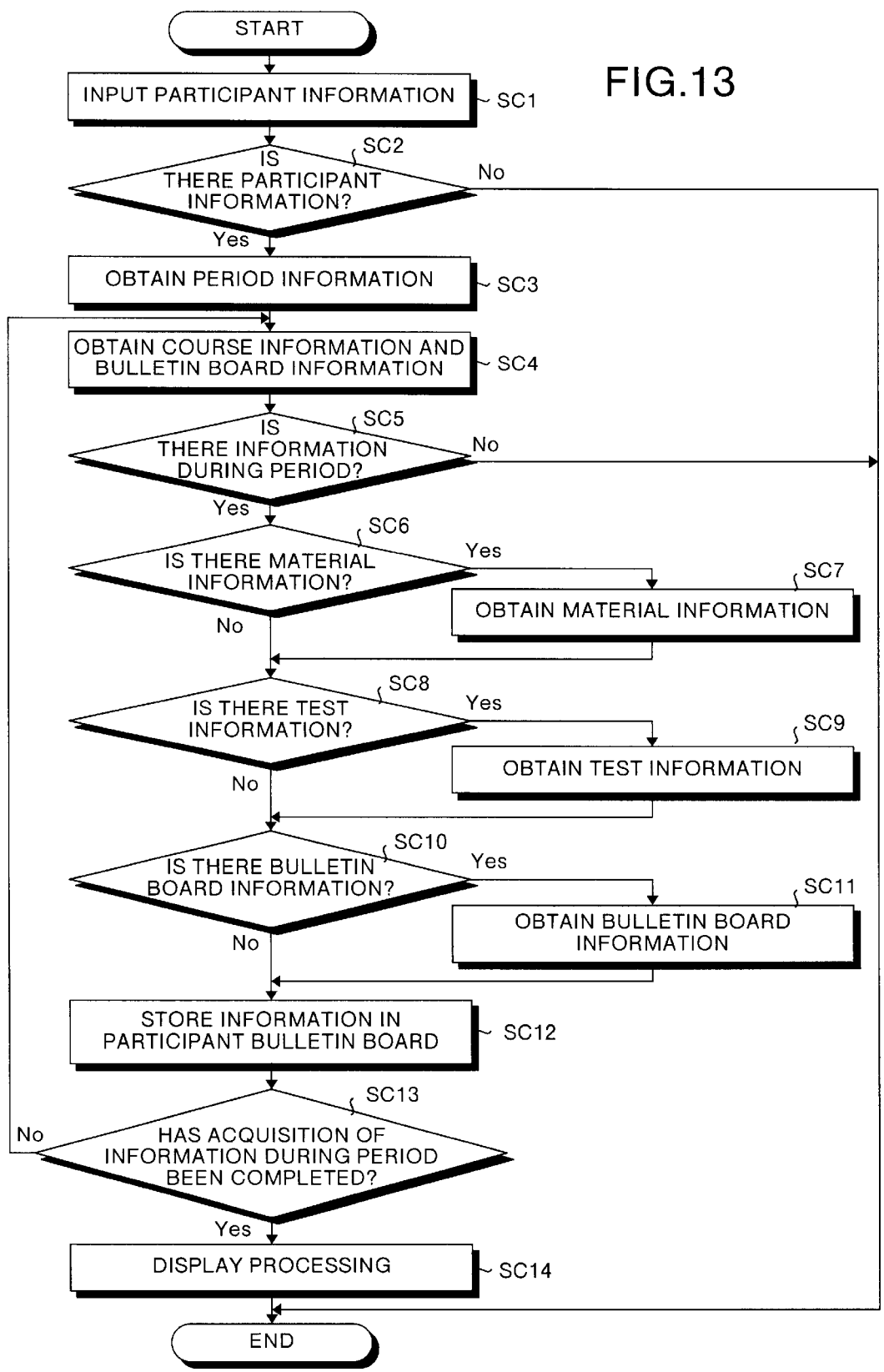
FIG. 13 is a flow chart for describing the operation of a bulletin control section 34 shown in FIG. 1.

Next, the detailed operation of one embodiment will be described with reference to flow charts shown in FIGS. 6, 7 and 13. FIGS. 6 and 7 are flow charts for describing the operations of the log-in control section 32 and the schedule allotment control section 33 shown in FIG. 1. FIG. 13 is a flow chart for describing the operation of the bulletin board control section 34 shown in FIG. 1.

Figure 8:
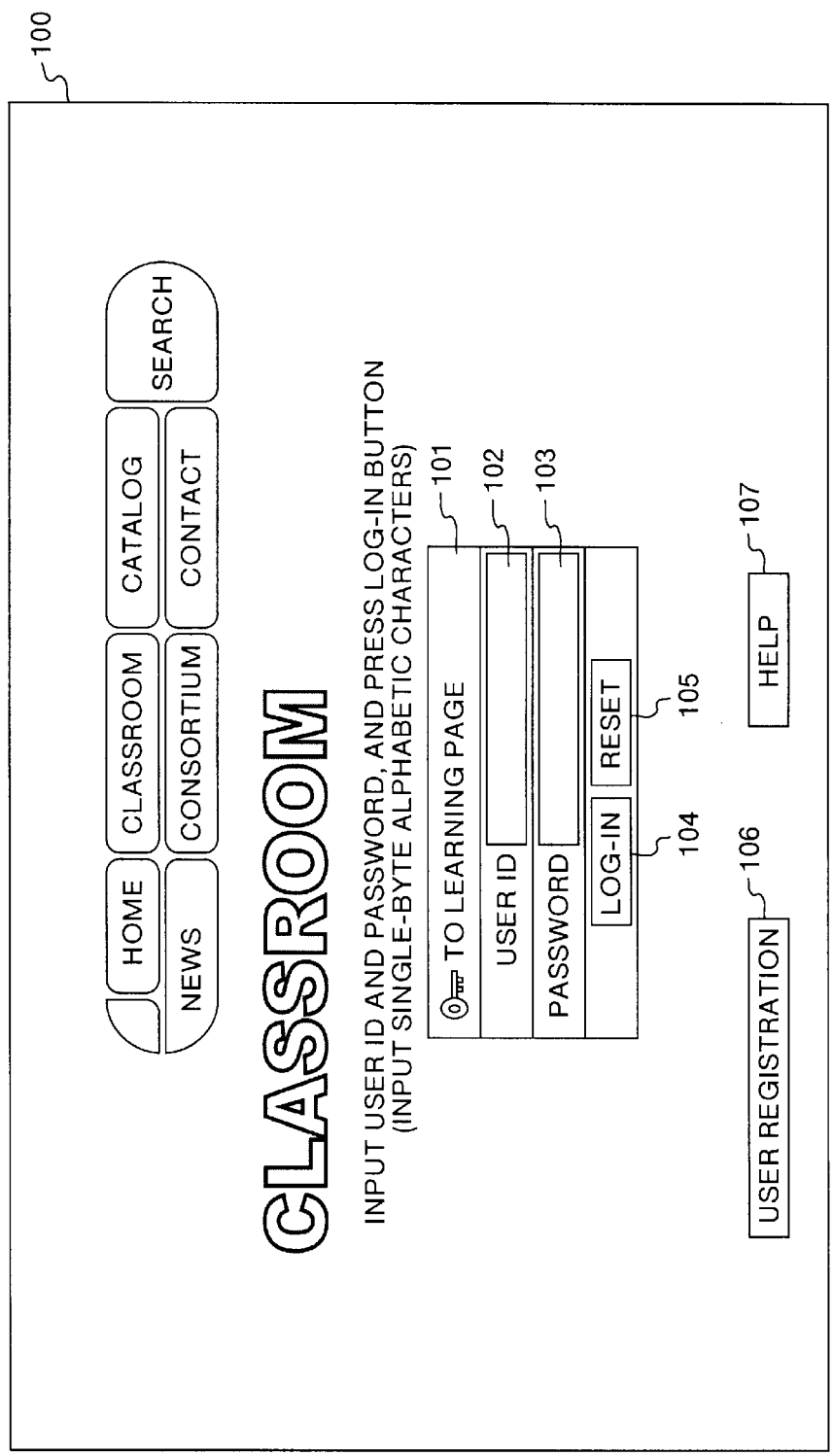
FIG. 8 shows a screen 100 in this embodiment.

If the client $10_1$, for example, shown in FIG. 1 accesses the online education server 30 through the Internet 20, a log-in screen 100 shown in FIG. 8 is displayed on the display section $12_1$ by a browser (not shown). On this screen 100, a user ID/password input section 101, a user registration button 106 for registering user information in the user information database 40 (see FIG. 2A) and a help button 107 are displayed.

On the user ID/password input section 101, a user ID input section 102 for inputting a user ID (see FIG. 2A, a password input section 103 for inputting a password (see FIG. 2A), a log-in button 104 and a reset button 105 are displayed.

In this state, in a step SB1 shown in FIG. 1, a user (or 'Fujitsu Taro' shown in FIG. 2A in this case) inputs "120010" (see FIG. 2A) as a user ID into the user ID input section 102 and "Taro10" (see FIG. 2A) as a password into the password input section 103, and then depresses the log-in button 104.

Following this, in a step SB2, the log-in control section 32 accesses the user information database 40 shown in FIG. 2A. In a step SB3, the log-in control section 32 refers to the user information database 40, thereby judging whether or not the user is a regular user. To be specific, if the log-in control section 32 collates the user ID and password inputted in the step SB1 with the user ID and the password in the user information database 40 and control section 32 to find that they are coincident with each other, then determines that the judgment result of the step SB3 is "Yes". If the collation result of the step SB3 shows that the user ID and password inputted in the step SB1 are not coincident with the user ID and password in the user information database 40 and control section 32, then the log-in control section 32 determines that the judgment result of the step SB3 is "No" and finishes a series of processings.

Here, if the judgment result of the step SB3 is "Yes", the log-in control section 32 extracts user information (such as "user ID") on the record of "Fujitsu Taro" from the user information database 40 shown in FIG. 2A in a step SB4. In a step SB5, the log-in control section 32 accesses the participant information database 50 shown in FIG. 2B. In a step SB6, the log-in control section 32 collates the "user ID" in the participant information database 50 with the "user ID" as the user information extracted in the step SB4, and judges whether or not there is a course which the user takes in the participant information database 50. If the judgment result of the step SB6 is "No", the log-in control section 32 finishes a series of processings.

In this case, the "user ID" (=120010) of Fujitsu Taro shown in FIG. 2A coincides with the "user ID" (=120010) on record 1 in the participant information database 50 shown in FIG. 2B. The log-in control section 32, therefore, determines that the judgment result of the step SB6 is "Yes". In a step SB7, the log-in control section 32 obtains information on "starting day" as starting day information from the participant information database 50 (see FIG. 2B).

In a step SB8, the log-in control section 32 extracts information on a target course from the course information database 70. In a step SB9, the log-in control section 32 judges whether or not there is target course information. If the judgment result of the step SB9 is "No", the log-in control section 32 finishes a series of processings. If the judgment result of the step SB9 is "Yes", the log-in control section 32 extracts information on the courses which the participant can take from the course information database 70 in a step SB10. In a step SB11, the log-in control section 32 judges whether or not the extraction of course information has been completed. If the judgment result of the step SB11 is "No", the log-in control section 32 repeats the processings of the step SB9 and the following.

If the judgment result of the step SB11 is "Yes", the log-in control section 32 displays a screen 200 including information on the courses which the participant can take, as shown in FIG. 9, on the display section $12_1$ in a step SB12. On the screen 200, a course information display section 201 which shows a list of information on the courses which the user (or Fujitsu Taro in this case) can take is displayed. In the course information display section 201, a detailed course information display section 202 displays a course title: "Project Management Basic" (see FIG. 3B), a course starting day: "2000.4.1~" and an enter key 203. The enter key 203 is depressed if the course is selected.

The detailed course information display section 204 also displays a course title: "Let's start Spreadsheet 2000", a course starting day: "2000.5.1~" and an enter key 205. The enter key 205 is depressed if the course is elected. As can be seen, the user (or Fujitsu Taro) can take the above-stated two courses.

In a step SB13 shown in FIG. 7, the schedule allotment control section 33 judges whether or not a course to be taken by the user has been selected by the user, i.e., whether the enter key 203 or 205 (see FIG. 9) has been depressed. If the judgment result is "No", the schedule allotment control section 33 finishes a series of processings. In this case, if it is assumed that the user has depressed the enter key 203, the schedule allotment control section 33 determines that the judgment result of the step SB13 is "Yes". Following this, the user is regarded as a participant.

In a step SB14, the schedule allotment control section 33 creates a participant bulletin board for displaying a schedule for the participant. FIG. 10 shows a screen 300 indicating one example of the participant bulletin board. On the screen 300, a class schedule display section 301 showing a schedule (items, planned starting days) for the course is displayed. On this class schedule display section 301, items 302 to 304, 305 . . . , planned starting days thereof and the like are displayed.

In a step SB15, the schedule allotment control section 33 extracts schedule information from the schedule information database 80 shown in FIG. 4A with the course code of the course selected in the step SB13 used as a key. Here, it is assumed that the schedule allotment control section 33 extracts the schedule information $80_1$ on course ID=1001 from the schedule information database 80.

In a step SB16, the participant inputs the course starting day and the course period of the course using the input section $11_1$ for the convenience of the participant. It is assumed that a standard learning period is 60 days (relative date) and that the participant inputs 60 days as the course period in the schedule information $80_1$ shown in FIG. 4A. In a step SB17, the schedule allotment control section 33 refers to the schedule information database 80 (or schedule information $80_1$ in this case).

In a step SB18, the schedule allotment control section 33 judges whether or not the course period (or 60 days in this case) inputted in the step SB16 is the standard course period (or 60 days in this case) of the course. Here, it is assumed that the schedule allotment control section 33 determines that the judgment result of the step SB18 is "Yes". In a step SB19, the schedule allotment control section 33 creates schedule information on the course by allotting the "relative dates" shown in FIG. 4A to respective items (curricula) based on the "standard starting day" shown in FIG. 3B.

In a step SB20, the schedule allotment control section 33 judges whether or not the allotment of the "relative days" has been completed. If the judgment result of the step SB20 is "No", the schedule allotment control section 33 repeats the processings of the step SB17 and the following. If the judgment result of the step SB20 is "Yes", the schedule allotment control section 33 displays schedule information on the participant bulletin board, for example, in a format shown in FIG. 10 in a step SB21.

If the judgment result of the step SB18 is "No", the schedule allotment control section 33 judges whether or not the course period inputted by the participant in the step SB16 is a possible course period in a step SB22. If the judgment result of the step SB22 is "No", a series of processings are finished. If the judgment result of the step SB22 is "No", the schedule allotment control section 33 judges whether or not it is possible to rearrange a schedule based on the "whether rearrangement is possible" shown in FIG. 4 in a step SB23. If the judgment result of the step SB23 is "No", a series of processings are finished.

If the judgment result of the step SB23 is "Yes", the schedule allotment control section 33 allots relative days based on the possible course period and the rearrangement information, thereby creating schedule information in a step SB24. Examples of the above-stated schedule information are shown in FIGS. 11A to 11C. A participant-specific schedule 400 shown in FIG. 11A represents the schedule information (standard course period) created in the step SB19.

A participant-specific schedule 410 shown in FIG. 11B represents schedule information if the participant takes the course starting on a starting day (April 8) instead of the standard starting day (April 4). A participant-specific schedule 420 shown in FIG. 11C represents schedule information (e.g., a course period=30 days) created in the steps SB24.

FIG. 12 shows a participant schedule 500 corresponding to the above-stated participant-specific schedules 400, 410 and 420. In the participant schedule 500, a detailed participant schedule 510 corresponds to the participant-specific schedule 400 and a detailed participant schedule 520 corresponds to the participant-specific schedule 410. Also, a detailed participant schedule 530 corresponds to the participant-specific schedule 420.

Next, the operation of the bulletin board control section 34 shown in FIG. 1 will be described with reference to a flow chart shown in FIG. 13. If a participant accesses the online education server 30 using, for example, the client $10_1$ shown in FIG. 1 through the Internet 20, the log-in screen 100 shown in FIG. 8 is displayed on the display section $12_1$ by a browser (not shown).

In this state, in a step SC1 shown in FIG. 13, the participant (or Fujitsu Taro shown in FIG. 2B) inputs participant information using the input section $11_1$. To be specific, the participant inputs "120010" (see FIG. 2B) as user ID into the user ID input section 102 and "Taro10" (see FIG. 2A) as a password into the password input section 103, and then depresses the log-in button 104.

Following this, in a step SC2, the bulletin board control section 34 accesses the participant information database 50 (see FIG. 2B) and the user information database 40 (see FIG. 2A), and judges whether or not the participant information (user ID and password) inputted in the step SC1 exist in the participant information database 50 and the user information database 40. Namely, in the step SC2, the bulletin board control section 34 authenticates whether the participant is a regular participant. If the judgment result of the step SC2 is "No", the bulletin board control section 34 finishes a series of processings.

In this case, it is assumed that the judgment result of the step SC2 is "Yes". In a step SC3, the bulletin board control section 34 obtains period information on the course ("starting day" to "ending day") from the "starting day" and the "final day" on the record of the participant (or Fujitsu Taro in this case) in the participant information database 50 shown in FIG. 2B. In a step SC4, the bulletin board control section 34 obtains course information and bulletin board information $90_1$ from the course information database 70 (see FIG. 3B) and the bulletin board information database 90 (see FIG. 4B) with the course code (see FIG. 2B) relating to the participant used as a key.

In a step SC5, the bulletin board control section 34 judges whether or not information during the period corresponding to the above period information exists in the bulletin board information $90_1$ with the "utterance day" in the bulletin board information $90_1$ used as a key. If the judgment result of the step SC5 is "Yes", the bulletin board control section 34 then judges whether or not "material" information exists in the course information obtained form the course information database 70. If the judgment result of the step SC6 is "No", the bulletin board control section 34 executes the processing of a step SC8.

If the judgment result of the step SC6 is "Yes", the bulletin board control section 34 obtains material information in a step SC7. In the step SC8, the bulletin board control section 34 judges whether or not test information exists in the bulletin board information $90_1$. If the judgment result of the step SC8 is "No", the bulletin board control section 34 executes the processing of a step SC10. If the judgment result of the step SC8 is "Yes", the bulletin board control section 34 obtains test information from the bulletin board information $90_1$ in a step SC9.

In the step SC10, the bulletin board control section 34 judges whether or not bulletin information exists. If the judgement result of the step SC10 is "No", the bulletin board control section 34 executes the processing of a step SC12. If the judgment result of the step SC10 is "Yes", the bulletin board control section 34 obtains bulletin board information in a step SC11. In the step SC12, the bulletin board control section 34 stores the information obtained from the steps SC4 to SC11 in a participant bulletin board exclusive for participants (e.g., the screen 300 shown in FIG. 10).

In a step SC13, the bulletin board control section 34 judges whether or not the acquisition of information during the period has been completed. If the judgment result of the step SC13 is "No", the processings of the step SC4 and the following are repeated. If the judgment result of the step SC13 is "Yes", the bulletin board control section 34 executes a processing for displaying the above-stated participant bulletin board (e.g., the screen 300 shown in FIG. 10) on the display section $12_1$ in a step SC14.

Here, if an item 305 is selected by the participant, a screen 600 shown in FIG. 14 is displayed on the display section $12_1$. This screen 600 is one to conduct "learning from Chapters 1 to 3". A plurality of items of utterance information obtained from the bulletin board information are displayed on a main display section 601. If a display button 602 is depressed after desired utterance information is obtained from among the plurality of items of utterance information, detailed information on the utterance information is displayed on a detailed display section 604. Also, if the participant gives new utterance, the participant depresses a new utterance button 603 and then writes the content of the utterance following an entry format which is not shown.

As another example, the schedule allotment control section 33 may create schedule information only when the difference between a desired course period for the participant and a standard course period is equal to or smaller than a threshold value. Alternatively, the schedule allotment control section 33 may instructs the participant to change the desired course period if the difference between the desired course period and the standard course period is greater than a threshold value.

As stated above, according to the present invention, the course starting day desired by the participant is set as the course starting day and schedule information corresponding to the desired course period is created by the schedule allotment control section 33, whereby a degree of freedom in a course schedule for the participant can be made higher. Furthermore, it is possible to set the length of the desired course period according to participant's skill. Thus, the participant can acquire education without causing the participant any strain and educational effect can be thereby enhanced.

One embodiment according to the present invention has been described in detail with reference to the drawings. The concrete examples of the constitution of the invention should not be limited to this embodiment and any changes in design within the scope of the invention are included in the present invention. For example, in one embodiment already described above, the function of the online education server 30 may be realized by recording an online education program for realizing the function of the online education server 30 on a computer readable recording medium 800 shown in FIG. 15 and allowing a computer 700 shown in FIG. 15 to read and execute the online education program recorded on this recording medium 800.

Figure 15:
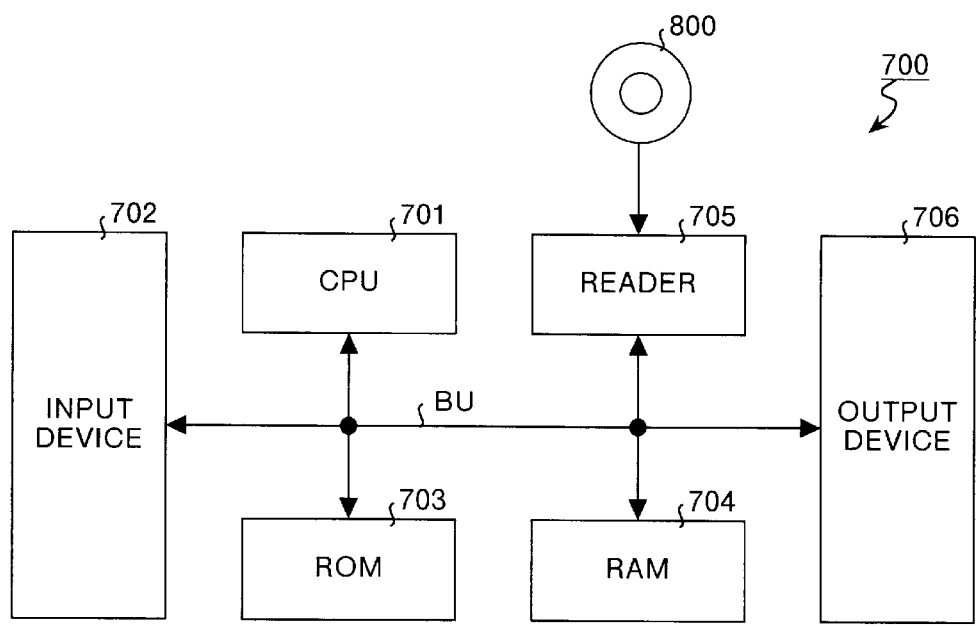
FIG. 15 is a block diagram showing a modification of this embodiment.

The computer 700 shown in FIG. 15 consists of a CPU 701 executing the online education program, an input device 702 including a keyboard, a mouse and the like, an ROM (read-only memory) 703 storing various data, an RAM (random-access memory) 704 storing operation parameters, a reader 705 reading the online education program from the recording medium 800, an output device 706 including a display, a printer and the like and a bus BU mutually connecting the respective constituent elements of the computer 700.

The CPU 701 reads the online education program recorded on the recording medium 800 through the reader 705 and then executes the online education program, thereby realizing the function of the online education server 30 already stated above. The recording medium 800 may involve not only a portable recording medium such as an optical disk, a floppy disk or a hard disk but also a transmission medium, such as a network, for temporarily recording and holding data.

As stated so far, according to the present invention, the course starting day desired by the participant is set as an actual course starting day and schedule information corresponding to a desired course period is created. Due to this, a degree of freedom in a schedule for the participant can be made advantageously higher. In addition, the present invention can set the length of the desired course period according to participant's skill. Due to this, it is possible for the participant to advantageously acquire education without causing any strain and to advantageously enhance educational effect.

Further, according to the present invention, schedule information is created only if the difference between the desired course period and the standard course period is within a threshold value. Thus, it is possible to advantageously avoid a case where the desired course period is extremely short (or extremely long) and to thereby advantageously prevent educational effect from decreasing.

Moreover, according to the present invention, the desired course period can be changed if the difference between the desired course period and the standard course period is greater than a threshold value. Thus, it is possible to advantageously prevent educational effect from decreasing.

Furthermore, according to the present invention, all information necessary for education, such as curriculum information on education courses, communication information on communication among teachers and participants and material information, are displayed on the electronic bulletin board. Thus, it is possible to advantageously enhance the convenience of the participants.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An online education device with which online education can be provided over a network to participants, the online education device comprising:

a schedule information database which stores standard schedule information on at least one educational course, where the standard schedule information includes a standard total course period, and where total course period refers to a length of time for actually performing the online educational course;

a reception unit which receives information on at least a day when a participant desires to start the course and a custom total course period for which the participant desires to perform the course, where the custom total course period is created by the participant changing the standard total course period;

a schedule information creation unit which sets the day when the participant desires to start the course as a day on which the course starts, and rearranges the standard schedule information to generate a schedule information corresponding to the custom total course period for which the participant desires to perform the course; and an electronic bulletin board control unit which controls an electronic bulletin board exclusive for the participant, the electronic bulletin board unit displaying at least curriculum information on the education course, previously submitted and stored bulletin board communication messages corresponding to the educational course and submitted by a teacher and participants enrolled in the course, and teaching-material information, where the participants each have an individual learning schedule independent of the other, and where the messages are displayed responsive to a participant accessing the bulletin board or the messages therein.

2. The online education device according to claim 1, wherein
said schedule information creation unit creates the schedule information only when a difference between the period for which the participant desires to take the course and a standard period for the course is within a certain range.

3. The online education device according to claim 1, wherein
said schedule information creation unit instructs the participant to change the period for which the participant desires to take the course when the difference between the period for which the participant desires to take the course and a standard period for the course is greater than a threshold value.

4. The online education device according to claim 1, wherein
the communication information includes the description of the course, questions and answers.

5. An online education method with which online education can be provided to participants, the method comprising:
storing standard schedule information on at least one educational course in a schedule information database, where the standard schedule information includes a standard total course period, and where total course period refers to a length of time for actually performing the online educational course;

receiving information on at least a day when a participant desires to start the course and a total course period for which the participant desires to perform the course from the participant, where the custom total course period is created by the participant changing the standard total course period;

setting the day when the participant desires to start the course as a day on which the course starts;

rearranging the standard schedule information to generate a schedule information corresponding to the period for which the participant desires to perform the course; and controlling an electronic bulletin board exclusive for the participant, the electronic bulletin board displaying at least curriculum information on the education course, previously submitted and stored bulletin board communication messages corresponding to the educational course and submitted by a teacher and participants enrolled in the course, and teaching-material information, where the participants each have an individual learning schedule independent of the other, and where the messages are displayed responsive to a participant accessing the bulletin board or the messages therein.

6. The online education method according to claim 5, wherein
the schedule information is created only when a difference between said period for which the participant desires to take the course and a standard period for the course is within a certain range.

7. The online education method according to claim 5, wherein
the participant is instructed to change the period for which the participant desires to take the course if the difference between said period for which the participant desires to take the course and a standard period for the course is greater than a threshold value.

8. The online education method according to claim 5, wherein
the communication information includes the description of the course, questions and answers.

9. A computer readable medium for storing instructions, which when executed by a computer, causes the computer to perform a process for providing online education to participants, the process comprising:
storing standard schedule information on at least one educational course in a schedule information database, where the standard schedule information includes a standard total course period, and where total course period refers to a length of time for actually performing the online educational course;

receiving information on at least a day when a participant desires to start the course and a total course period for which the participant desires to perform the course from the participant, where the custom total course period is created by the participant changing the standard total course period;

setting the day when the participant desires to start the course as a day on which the course starts;

rearranging the standard schedule information to generate a schedule information corresponding to the period for which the participant desires to perform the course;

controlling an electronic bulletin board exclusive for the participant, the electronic bulletin board unit displaying at least curriculum information on the education course, previously submitted and stored bulletin board communication messages corresponding to the educational course and submitted by a teacher and participants enrolled in the course, and teaching-material information, where the participants each have an individual learning schedule independent of the other, and where the messages are displayed responsive to a participant accessing the bulletin board or the messages therein.

10. The computer readable medium of claim 9, wherein the communication information includes the description of the course, questions and answers.

11. A method of networked education, comprising:

making a class managed by a teacher available over a network to participants in the class, where the class comprises related lessons and materials made available over the network within a predetermined range of time;

allowing each participant to set a total time to spend in performing the lessons to complete the class, where each participant can set a different total time by changing a standard total time;

allowing each participant to create an individual schedule for performance of the lessons within the predetermined range of time, where each different participant can set a different schedule and total time;

individually performing the lessons over the network by the participants according to their individual total times and schedules within the predetermined time range; and providing a message board associated with and accessible with the class and allowing participants and a teacher of the class to post messages to the message board, where a posted message is displayed to the teacher or a participant in response to a request from the teacher or participant after they have accessed the class.

* * * * *